United States Patent [19]
Uttrachi et al.

[11] 3,854,028
[45] Dec. 10, 1974

[54] HIGH SPEED VERTICAL ELECTRO-SLAG WELDING

[75] Inventors: Gerald D. Uttrachi, Westfield; Daniel Christian, Wayne, both of N.J.

[73] Assignee: Union Carbide Corporation, New York, N.Y.

[22] Filed: Sept. 18, 1973

[21] Appl. No.: 398,304

[52] U.S. Cl. ................................. 219/126, 219/73
[51] Int. Cl. ............................................ B23k 9/18
[58] Field of Search ............................. 219/73, 126

[56] References Cited
UNITED STATES PATENTS
2,240,405  4/1941  Kinzel ............................. 219/73 X
3,431,385  3/1969  Santilhano ......................... 219/73
3,612,817  10/1971  Tichelaar et al. ................. 219/73 X Primary Examiner—J. V. Truhe
Assistant Examiner—N. D. Herkamp
Attorney, Agent, or Firm—Eugene Lieberstein

[57] ABSTRACT

A process for electroslag welding in the vertical direction at high speeds, comprising, controlling the temperature of the molding shoes such that less than 35 per cent of the solidified weld surface area is covered by a patch network of solidified slag and by using a wire extension of increased length.

5 Claims, 5 Drawing Figures

PATENTED DEC 10 1974 3,854,028
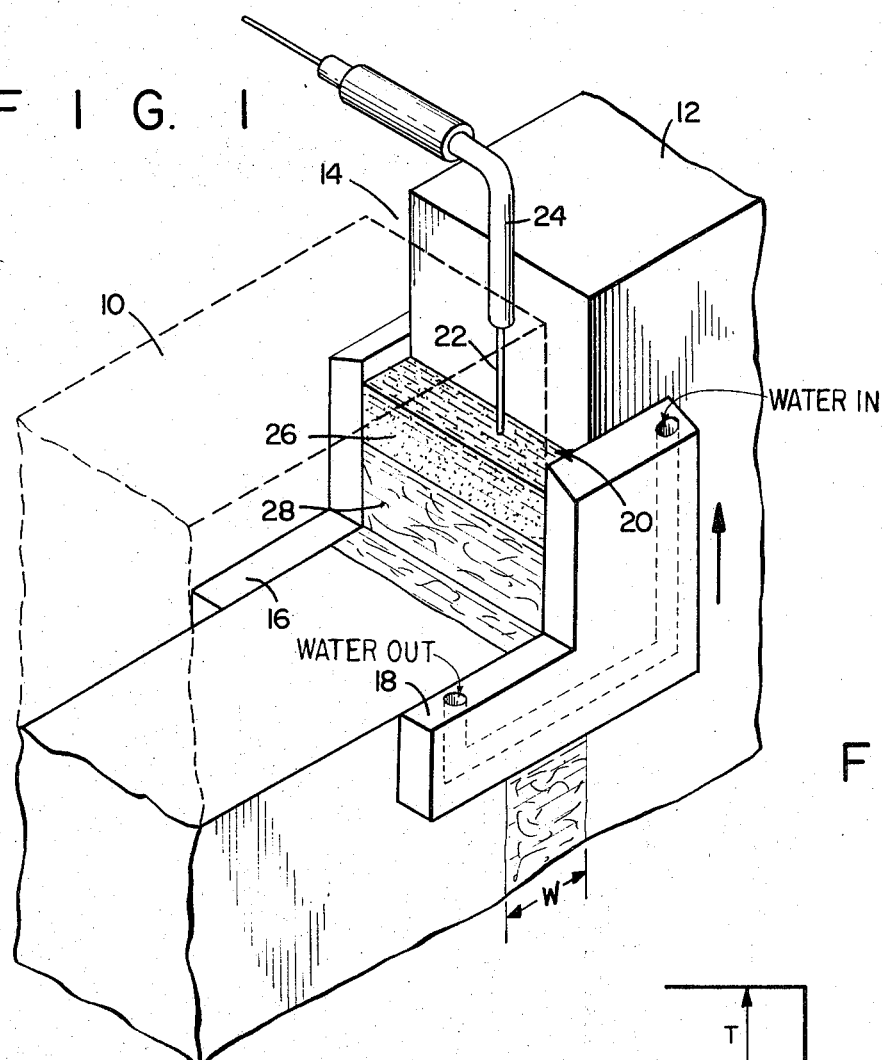
FIG. 1
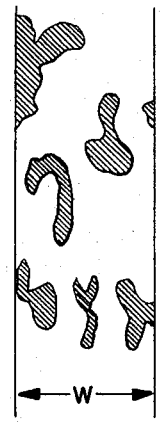
FIG. 3
FIG. 2a
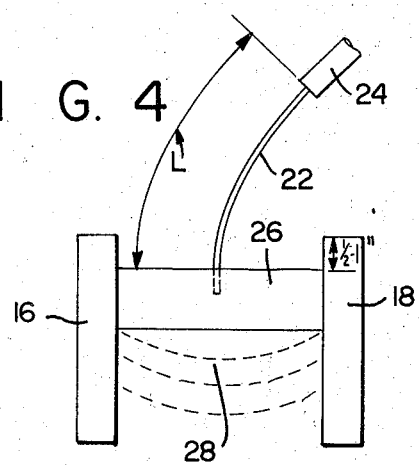
FIG. 4
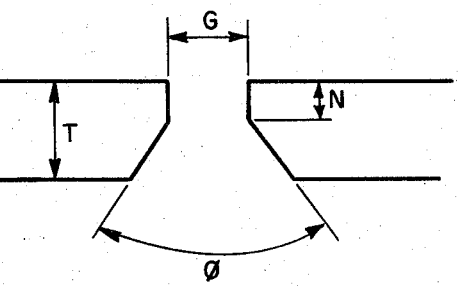
FIG. 2b

HIGH SPEED VERTICAL ELECTRO-SLAG WELDING

This invention relates to vertical electroslag welding and more particularly to a method of vertical electroslag welding at high speed.

BACKGROUND

In vertical electroslag welding, the workpieces to be welded are placed in the vertical position with a gap exposed between their parallel edges. Two molding shoes, usually of copper, are located on both sides respectively of the gap with their interiors contoured to form in conjunction with the gap a cavity into which is added a granular flux and filler metal. The filler metal is continuously supplied from a spool of consumable electrode. Current is passed through the electrode to form within the cavity a puddle of molten metal and slag. A suitable mechanism propels the copper molding shoes, torch, power supply connection and consumable electrode upward along the gap resulting in the vertical progression of the weld. Because of the direction of the weld and other limiting parameters, the electroslag process has heretofore always been carried out at a speed of below 3 inches per minute (ipm) and conventionally at only around one inch per minute to attain the high weld quality expected from this process.

Various attempts have been made in the past to increase the welding speed without reducing weld quality, all without any significant success.

It has been discovered in accordance with the present invention that the vertical electroslag welding speed can be increased to upwards of an order of magnitude above conventional speeds using conventional joint designs and volumes for workpieces having thicknesses between ⅜ and 2 inches. The process of the present invention, whereby speeds of between 3–10 ipm have been achieved without a decrease in weld quality, comprises the steps of:

a. forming a substantially vertical joint between the edges of the workpieces to be welded;
b. surrounding the joint at a predetermined starting location with means to form a cavity;
c. depositing a granular flux into the cavity;
d. locating the end of a consumable filler wire electrode into the cavity;
e. forming a molten slag within the cavity;
f. passing a current of at least about 500 amperes through said molten slag;
g. advancing said cavity forming means vertically upstream from said starting location at a speed of between 3–10 inches per minute while continuously passing said electrode into said molten slag; and
h. controllably cooling said cavity forming means so as to form a substantially discontinuous solidified slag cover upon the surface of the solidified weld metal which represents no more than 35 percent of the total solidified weld surface area per linear foot of weld length.

It is therefore the principal object of the present invention to provide a method of vertical electroslag welding at speeds of up to about 10 inches per minute.

Other objects and advantages of the present invention will become apparent from the following detailed description when taken in connection with the accompanying drawings of which:

FIG. 1 is a perspective view of the vertical electroslag process of the present invention with the weld cavity exposed;

FIGS. 2a and 2b illustrate two conventional weld joint design configurations;

FIG. 3 is an enlarged plan view illustrating a typical solidified weld surface formed in accordance with the process of the present invention after completion of the weld and before removal of the slag cover; and FIG. 4 is a diagrammatic side view of FIG. 1 illustrating certain key relationships.

The method of the present invention does not alter the basic constituent characteristics of the vertical electroslag welding process. The dramatic increase in speed attained by the method of the present invention is attributable solely to certain parameter changes coupled with the control over the cooling temperature of the molding shoes as will be discussed at length hereafter.

Referring now to FIGS. 1–4 inclusive wherein in FIG. 1, two workpieces or plates 10 and 12 respectively are shown located in substantial vertical alignment with respect to each other with a gap 14 maintained between the edges of the plates. The gap 14 extends vertically from the bottom to the top of the plates and forms the vertical seam to be welded. The plate edges may be prepared to form a welding joint of any conventional configuration such as a square butt, or a vee groove as illustrated in FIGS. 2a and 2b respectively, and to provide a weld joint of conventional area or volume, i.e., without reducing the plate gap separation. On each side of the gap 14 is located a molding shoe 16 and 18 respectively which in conjunction with the gap 14 forms a cavity 20 into which filler weld metal from the electrode 22 is deposited. The electrode 22 is fed from a spool of wire (not shown) through a contact tube 25 and into the cavity 20. The equipment for riding upwards on the welding seam and for carrying the molding shoes 16 and 18, the electrode 22 and associated wire feed mechanism is not shown and does not form a part of the present invention. Stated otherwise, any coventional vertical electroslag rider mechanism may be employed to carry out the method of the present invention.

The process of the present invention is initiated, as is typical to electroslag welding, by starting an electric arc beneath a blanket of a granular flux which is deposited into the cavity 20. As soon as a sufficiently thick layer of hot molten slag 26 is formed, it is believed that all arc action stops and the current then passes from the power supply (not shown) through the electrode 22 to the plates 10 and 12 respectively, with the molten slag 26 as the conductive medium. The heat generated melts both the edges of the plates and the immersed end of the electrode forming a molten pool of metal 28 which settles beneath the molten slag and slowly solidifies to form the weld.

One characteristic common to all prior art vertical electroslag operations is the formation of a substantially continuous deposit or layer of solidified slag over the completed weld surface. Although this layer of slag is easily removed and has no utility, its formation has always been considered an inherent characteristic of the process. One common explanation given for the slag layer is simply that the molten slag in contact with the cooled copper mold results in a plate out of a thin film or layer of slag. The slag layer is formed as a substantially continuous covering over the solidified weld. The thickness of the slag layer is usually uniformly about 1/32 of an inch.

With high weld speeds the slag layer would become excessively thick at the bond line where an unacceptable underfill occurred. This may happen when the operator increases the voltage to ensure for adequate fusion of the plate edges. The increase in voltage raises the heat generated in the molten pool which in turn can cause excessive wetting and too thick a slag layer. Alternatively, lack of fusion at the plate edges may be the result of trying to weld with too high a progression rate. Another defect attributable to excessive weld speed is internal cracking of the weld. Hence, in the past, a trade off to achieve a good quality weld was a low operating speed in the range of between 1-2 ipm under a set of operation parameters which has been empirically established over the years. A typical set of conventional electroslag welding parameters is given below:

temperature itself and possibly by designing the shoes for this effect at normal flow rates. Nonetheless, by appropriate shoe temperature adjustment only a spotty network of slag areas have been observed, as pictorially depicted in FIG. 3, and which represent as little as 5 percent of the total surface area of the weld.

In all known prior art cases the slag layer represents at least 50 percent of the solidified weld surface area per linear foot of length and is substantially continuous in its nature. The slag cover in accordance with the principals of the present invention is represented by a discontinuous network of patch areas of slag which may not exceed 35 percent of the solidified weld surface area per linear foot of length. For purposes of the present disclosure the phrase "solidified weld surface area per linear foot of length" shall mean the width of the welding (W) measured from bond line to bond line as such is defined by the standard terminology of the American Welding Society (AWS) multiplied by any typical linear foot of the weld length.

TABLE I

| Plate 'T' in. | Joint Type | Angle 'φ' | Gap 'G' | Nose 'N' | Arc Volts | Welding Amps. | Wire Feed Approx. ipm | Crawl. Travel Approx. ipm |
|---|---|---|---|---|---|---|---|---|
| 1/2 | Sq B | — | 5/8–3/4 | — | 35 | 300–325 | 115 | 2.0 |
| 5/8 | Sq B | — | 11/16–13/16 | — | 36 | 350–400 | 140 | 1.7 |
| 5/8 | V | 60 | 1/4 min. | 0 | 36 | 300–325 | 115 | 1.5 |
| 3/4 | Sq B | — | 3/4–7/8 | — | 38 | 350–400 | 140 | 1.3 |
| 3/4 | V | 60 | 1/4 min. | 0 | 38 | 300–350 | 125 | 1.2 |
| 1 | Sq B | — | 7/8–1 | — | 40 | 400–450 | 160 | 1.0 |
| 1 | V | 60 | 1/4 min. | 0 | 40 | 350–400 | 140 | 1.0 |
| 1 1/4 | Sq B | — | 1–1 1/8 | — | 42 | 500–550 | 230 | .9 |
| 1 1/4 | V | 60 | 1/4 min. | 1/4 | 42 | 400–450 | 160 | 1.1 |
| 1 1/4 | V | 45 | 1/4 min. | 1/4 | 42 | 400–450 | 160 | 1.2 |
| 1 1/2 | Sq B | — | 1–1 1/8 | — | 46 | 500–550 | 230 | .8 |
| 1 1/2 | V | 45 | 1/4 min. | 3/8 | 46 | 450–500 | 180 | .8 |
| 2 | Sq B | — | 1–1 1/8 | — | 48 | 500–550 | 230 | .6 |
| 2 | V | 45 | 1/4 min. | 3/8 | 48 | 475–525 | 220 | .6 |

By following the principals of the present invention, speeds of up to 10 inches per minute may be achieved. The most significant finding in accordance with the present invention and which may be primarily related to the increase in speed has been the noted lack of slag layer on the solidified weld. The high speeds have been achieved without any affect upon weld quality even, quite surprisingly, with respect to edge fusion and freedom from cracks. Yet, by preventing the formation of a substantially continuous solidified slag layer while still operating in accordance with electroslag principals, under a blanket of molten slag, heretofore unattainable speeds may now be achieved and without a decrease in the weld quality. The weld surface at the higher speeds is not only acceptable, but it has been also shown that at the higher speeds the amount of base plate heat affected zone (HAZ) CVN input degradation is significantly reduced.

The lack of slag covering has been obtained primarily by controlling the cooling temperature of the molding shoes 16 and 18 respectively, i.e. the extent of cooling of the shoes 16 and 18 have been shown to critically affect speed performance. The shoe temperature may be controlled by adjusting the rate of flow of cooling fluid through the shoes or through adjustment of the fluid Several factors other than shoe temperature have also been observed as relevant in attaining the high welding speeds of the present invention without impairing the resultant weld quality when related to comparable welds at low speeds. In particular, the distance the electrode 22 extends from its contact and guide tube 24 until contact is established with the molten slag, indicated by the letter (L) in FIG. 4 and referred to hereinafter by the expression "wire extension," should be maintained within a range of between 2–4 inches; which distance is substantially greater than conventional wire extensions heretofore employed using this process. Moreover, even within this highly preferred range there is a further preferred and more limited extension range depending upon the chosen welding parameters and joint design.

Further factors, some of which represent obvious requirements for welding at high speed are electrode feed rate, current and voltage. It should be noted, and is exemplified by Tables II and III respectively, that conventional plate gap and plate angle dimensions may be used.

Results from a series of tests for the two most typical joint types as shown in FIGS. 2a and 2b respectively, are documented hereinbelow in Table II.

TABLE II

| | Col. (A) | Col. (B) | Col. (C) | Col. (D) | Col. (E) | Col. (F) | Col. (G) |
|---|---|---|---|---|---|---|---|
| Weld. No. | 628-23 | 628-21(top) | 628-32B | 628-32A | 628-37 | 628-42 | 628-45 |
| Plate Thickness (T) in. | 1" | 1" | ¾" | ¾" | 1" | ⅜" | ½" |
| Joint Type | Vee | Vee | Sq.Butt | Vee | Vee | Sq.Butt | Vee |
| Plate Gap (G) in. | ¼ | ¼ | 13/16 | ¼ | ¼ | ⅝ | ¼ |
| Plate Nose (N) in. | ⅛ | ⅛ | — | 0 | 0–⅛ | — | 0 |
| Vee Angle, deg. | 45 | 45 | — | 45 | 45 | — | 45 |
| Electrode Extension (L) in. | 2¾–3½ | 2¾–3½ | 2½–3½ | 2½–3½ | 2¾–3½ | 2 | 2¼ |
| Wire Feed, ipm | 390 | 590 | 450 | 450 | 360 | 350 | 350 |
| Amps, dcrp | 600 | 725 | 600 | 600 | 625 | 625 | 575 |
| Volts, dcrp | 44 | 42 | 41 | 41 | 47–50 | 35 | 34 |
| Travel, ipm | 5 ipm | 8.5 ipm | 4.5 ipm | 6.5 ipm | 3.5 ipm | 7 ipm | 5 |
| Water Flow (total) gpm | 1.5 | 1.67 | 1.50 | 1.50 | 1.50 | .9 | 1.2 |
| Wire Type; 3/32" dia. | Tubular | Tubular | Tubular | Tubular | Solid | Tubular | Tubular |
| Weld Bends: 180° guided | no defects | no defects | no defects | no defects | no defects | no defects | no defects |
| Weld Tensile: | | | | | | | |
| Ultimate, ksi | 69 | — | — | — | — | | |
| Yield, ksi | 49 | — | — | — | — | | |
| Elong, % | 28 | — | — | — | — | | |
| Red in Area, % | 71 | — | — | — | — | | |
| Weld Impacts: | | | | | | | |
| Ft-lbs at RM | 81 | 86 | — | — | — | | |
| 0°F | 45 | 46 | — | — | — | | |
| –20°F | 50 | 28 | — | — | — | | |
| –40°F | 33 | — | — | — | — | | |
| Chemistry-Weld | | | | | | | |
| C | — | .07 | — | — | .19 | | |
| Mn | — | 1.53 | — | — | 1.52 | | |
| Si | — | .35 | — | — | .036 | | |
| S | — | .018 | — | — | .022 | | |
| P | — | .011 | — | — | .015 | | |

The above documented results were obtained primarily from tests conducted with a 3/32 inch tubular wire electrode with the single exception of column E in which a solid steel wire electrode was used. A tubular wire electrode is defined by a core of metallic ingredients covered by a steel sheath. A chemical analysis of the tubular electrode used throughout the testing procedure and based upon its total weight, is as follows: .05 – .12% C; 1.2 – 2.4% Mn; .2 – .5% Si; balance Iron with an oxygen concentration between about 200 ppm and 2000 ppm. The above chemical analysis can be achieved with a 20 weight percent core containing the following ingredients: about 4.5 to 10.5 core weight percent of manganese; about 1.0 to 2.5 core weight percent silicon; and the balance iron powder, the oxygen content of the wire being about 1000 ppm.

The solid steel wire electrode tested in column E of Table II has a chemical composition based upon its total weight as follows: nominally .14% C; 2.00% Mn; balance Iron.

Although other electrodes of varying size and composition have not been tested, it is theorized that by following the method of the present invention speeds of up to as much as 10 ipm will be obtained using any conventional electroslag electrode wire composition, size and type.

A generalized set of welding parameters is set forth below in Table III and have been postulated based upon the documented results of Table II and upon general observations. The wire extension length (L) is indicated as based upon a 3/32 inch tubular wire. As is well known to those skilled in the art, a smaller diameter wire will require a smaller extension and a larger diameter wire a larger extension in order to maintain similar current density times electrode extension parameters.

TABLE III

| Plate Thickness (T) | ⅜ | ½ | | ¾ | | 1 | | 1¼ | 1½ | 2 |
|---|---|---|---|---|---|---|---|---|---|---|
| Joint Type | S.B. | S.B. | S.B. | Vee | S.B. | Vee | S.B. | Vee | S.B. | S.B. |
| Plate Gap (G) inches | ½–⅝ | ⅝–¾ | ¾–⅞ | — | ¾–1 | — | ⅞–1¼ | — | ⅞–1¼ | ⅞–1¼ |
| Plate Angle (θ) deg | — | — | — | 40–60 | — | 35–55 | — | 30–50 | — | — |
| Weld Speed, (ipm) | 6–10 | 5–9 | 4–8 | 6–10 | 4–7 | 7–10 | 3–5 | 4–6 | 3–4 | 2–3 |
| Wire Feed, lb/hr | | 35–50 | | | 40–70 | | | | 50–75 | |
| Amps, DC | | 500–600 | | | 550–750 | | | | 600–800 | |
| Volts | | 30–40 | | | 37–47 | | | | 40–50 | |
| Wire Extension¹ (L) | | 2–3 | | | 2¼–4 | | | | 3–4 | |

¹Wire extension data based upon use of 3/32" tubular wire.

What is claimed is:

1. A method of welding workpieces, having thicknesses of between 3/8 to 2 inches, in a substantially vertical direction, under a blanket of a molten conductive slag, at high speed, comprising the steps of:
   a. forming a substantially vertical joint between the edges of the workpieces to be welded;
   b. surrounding said joint at a predetermined starting location with means to form a cavity;
   c. depositing a granular flux into said cavity;
   d. submerging the end of a consumable filler wire electrode beneath the surface of said deposit of granular flux;
   e. initially establishing an electric arc under said deposite of flux for forming said molten slag within said cavity;
   f. passing a current of above about 500 amperes through said electrode;

g. advancing said cavity forming means vertically upstream from said starting location at a speed of between 3–10 inches per minute while continuously feeding said electrode into said molten slag; and h. controllably cooling said cavity forming means so as to form a substantially discontinuous solidified slag cover upon the surface of the solidified weld metal which represents no more than 35 percent of the total solidified weld surface area per linear foot of weld length.

2. A method of welding as defined in claim 1 further comprising the step of maintaining an electrode extension of above about 2 inches for a tubular filler wire electrode having a diameter of about 3/32 inches.

3. A method of welding as defined in claim 2 wherein said tubular filler wire electrode has a total weight composition comprising less than .12% carbon; about 2% manganese; about .35% silicon and balance iron.

4. A method as defined in claim 3 wherein said slag cover represents between 5–25% of the total solidified weld surface area per linear foot of length.

5. A method as defined in claim 1 wherein said consumable filler wire electrode is solid.

* * * * *